United States Patent [19]

Niwa et al.

[11] Patent Number: 4,769,807
[45] Date of Patent: Sep. 6, 1988

[54] LOOP BACK CONTROL SYSTEM

[75] Inventors: Tokuhiro Niwa; Hisashi Matsumura; Atsushi Ugajin, all of Hadano, Japan

[73] Assignee: Hitachi, Ltd., Tokyo, Japan

[21] Appl. No.: 84,099

[22] Filed: Aug. 11, 1987

[30] Foreign Application Priority Data

Aug. 13, 1986 [JP] Japan .................. 61-188430

[51] Int. Cl.⁴ .............................. H04J 3/14
[52] U.S. Cl. ........................ 370/16; 370/15; 370/88; 340/825.05; 371/11
[58] Field of Search ......... 370/15, 16, 88; 371/8, 371/11, 22; 340/825.05, 825.01

[56] References Cited

U.S. PATENT DOCUMENTS 4,446,551  5/1984  Seo ........................ 370/88
4,530,085  7/1985  Hamada et al. ............. 370/16

Primary Examiner—Douglas W. Olms
Assistant Examiner—Min Jung
Attorney, Agent, or Firm—Antonelli, Terry & Wands

[57] ABSTRACT

In a loop communication system in which a plurality of stations connected to a pair of loop transmission lines comprised of a main transmission line and a preparatory transmission line communicate with each other through the loop transmission lines, one of the transmission lines has to be looped back to the other when failures occur in both the transmission lines by escaping from a point at which the failures occur. When the master station sequentially transmits loop back command signals to slave stations connected to the loop transmission lines, it takes into consideration the number of slave stations present between the master station and an interrogated slave station inclusive thereof so as to vary the monitoring time in accordance with a turn around time required for the master station to receive a response signal sent from the interrogated slave station being in receipt of a loop back command signal, thereby reducing the time for loop back.

7 Claims, 12 Drawing Sheets

4,769,807

LOOP BACK CONTROL SYSTEM

BACKGROUND OF THE INVENTION

This invention relates to data communications effected through loop transmission lines and more particularly to a loop back control system.

In a prior art loop back system as disclosed in Japanese Patent Unexamined Publication 59-154843, after transmitting a loop back command to a slave station, the master station awaits a carrier wave transmitted from the interrogated slave station until a predetermined interval of time calculated on the basis of a maximum network configuration has elapsed and then it decides either success of loop back if the master station receives the carrier wave or failure of loop back unless the master station receives the carrier wave, raising a problem that a formation of loop back is time-consuming.

SUMMARY OF THE INVENTION

An object of this invention is to reduce the time for a loop back operation executed when the system is to be recovered from a failure.

According to the invention, to accomplish the above object, after transmitting a loop back command to a slave station, the master station calculates a turn around time required for the master station to receive a response signal from the interrogated slave station on the basis of the number of slave stations present between the master station and the interrogated slave station inclusive thereof and then it decides failure of loop back unless the master station receives a carrier wave from the interrogated slave station within the turn around time, thereby reducing the failure recovering time.

DESCRIPTION OF THE PREFERRED EMBODIMENTS

Figure 1:
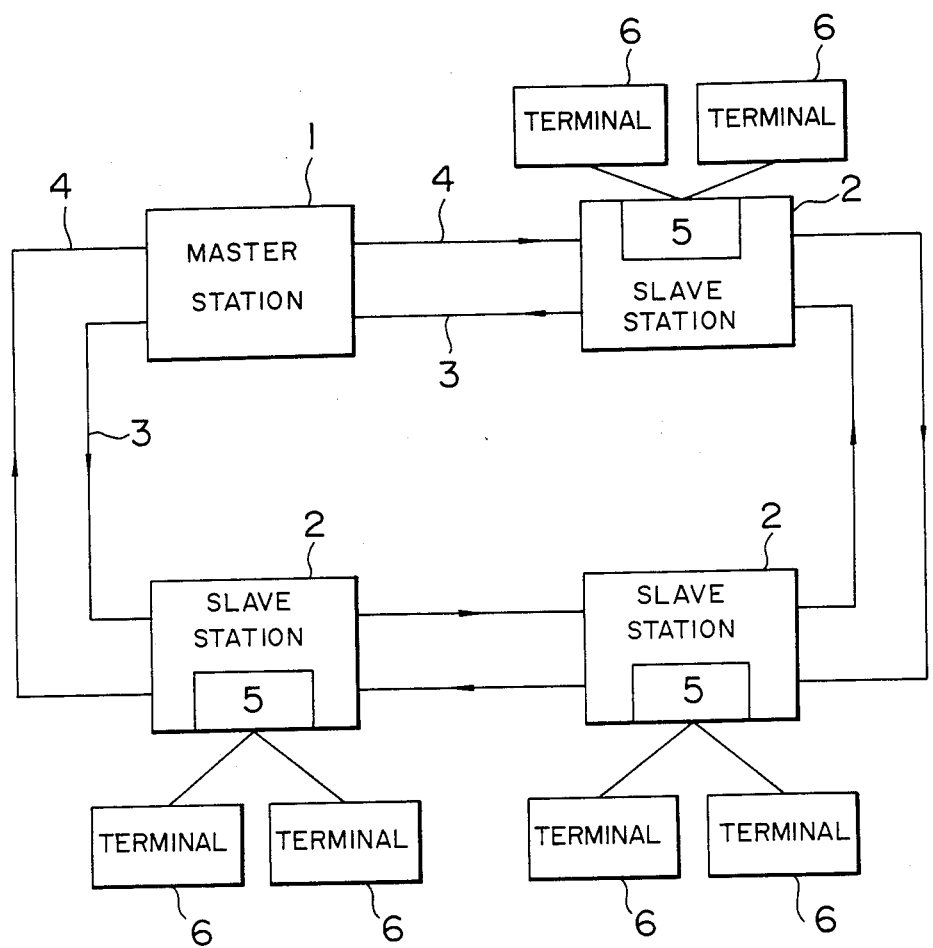
FIG. 1 is a block diagram schematically illustrating a loop communication system according to an embodiment of the invention.

The invention will now be described by way of example with reference to the accompanying drawings. As shown in a schematic block diagram of FIG. 1, a loop communication system according to an embodiment of the invention has a network comprised of a master station 1 for handling network management and for controlling loop reconfiguration, a plurality of slave stations 2 each operative to handle communication control and perform loop back of transmission line in response to a loop back command from the master station 1, a main transmission line 3 principally used for loop communications, a preparatory transmission line 4 with an opposite transmission direction to the main transmission line 3 and used for loop communications when the main transmission line 3 has a failure, and terminals 6 connected to each slave station 2 and communicating with an associated slave station through a terminal interface 5.

Figure 2:
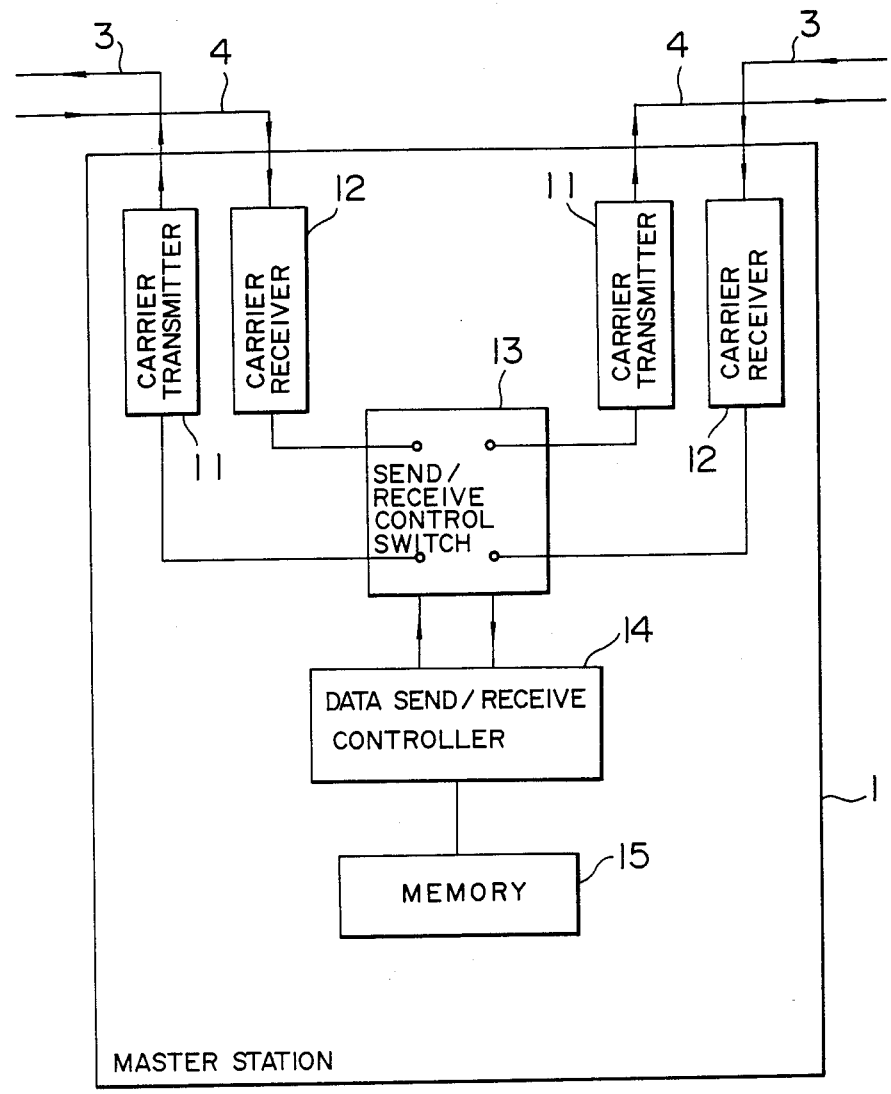
FIG. 2 is a block diagram illustrating an internal configuration of the master station.
Figure 3A:
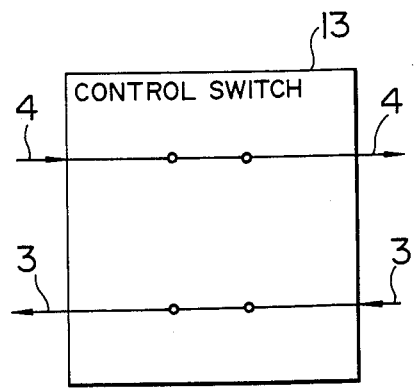
FIGS. 3A to 3C are diagrams explaining the operation of a send/receive control switch.
Figure 3B:
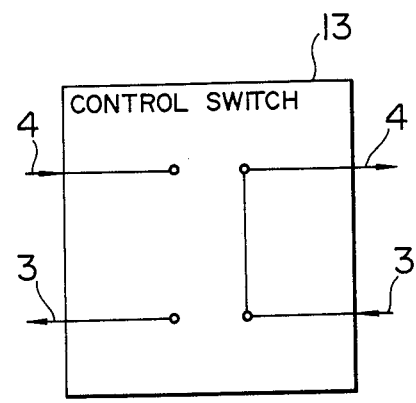
Figure 3C:
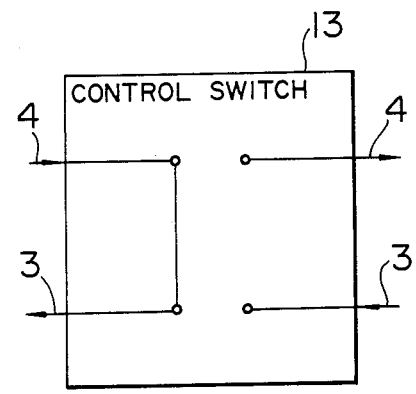
Figure 4:
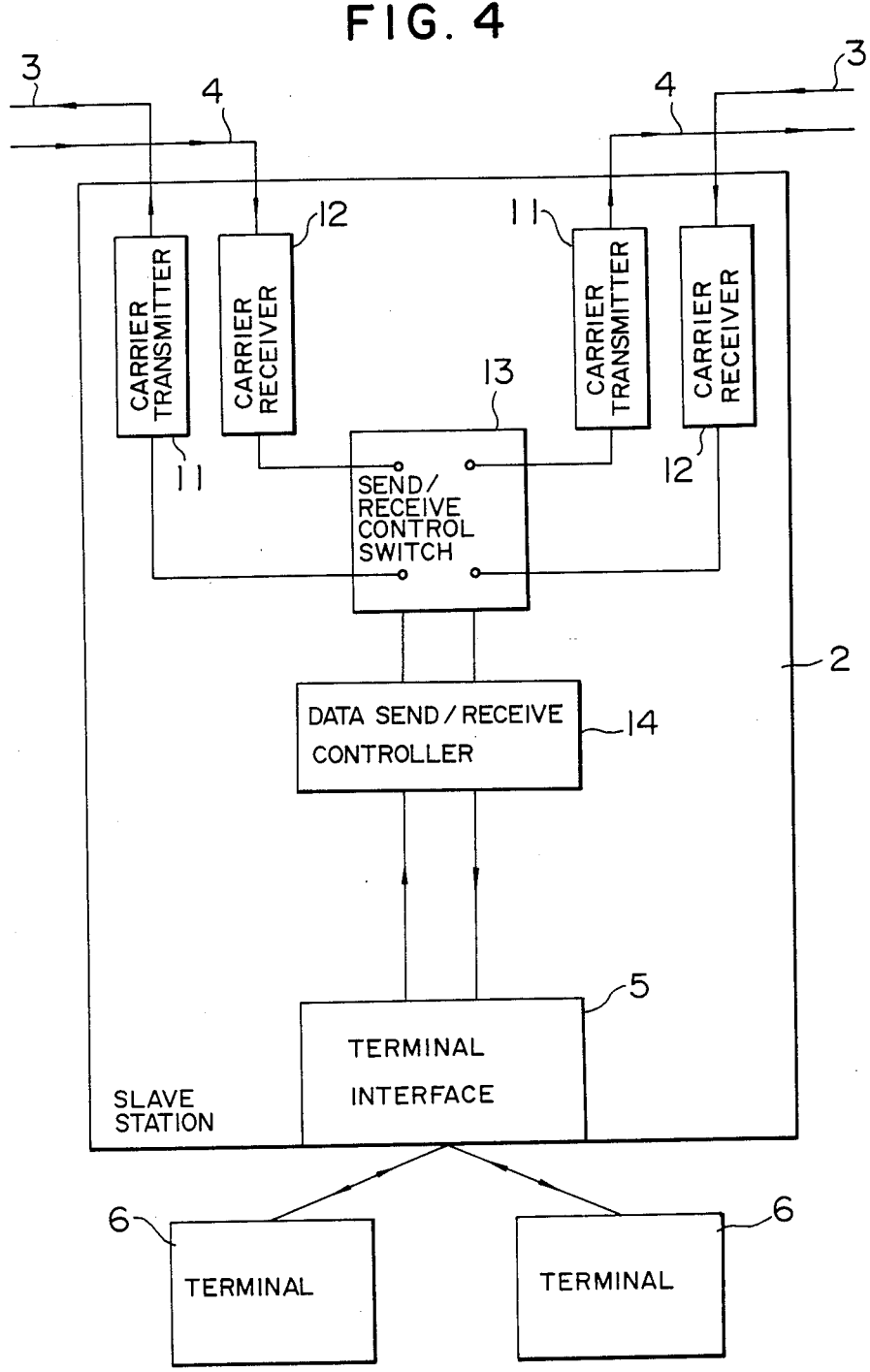
FIG. 4 is a block diagram illustrating an internal configuration of a slave station.

In regard of the internal construction, the master station 1 comprises, as illustrated in block form in FIG. 2, carrier transmitters 11, carrier receivers 12, a send-/receive control switch 13, a data send/receive controller 14 for sending and receiving of data and controlling the send/receive control switch 13, and a memory 15 for storing the information concerned with a network configuration and which indicates the positional relation between the master station and the individual slave stations connected thereto along the loop. Under the direction of the data send/receive controller 14, the send/receive control switch 13 operates as shown in FIG. 3A to relay a carrier received from the main transmission line 3 to the main transmission line 3 and a carrier received from the preparatory transmission line 4 to the preparatory transmission line 4, operates as shown in FIG. 3B to loop back a carrier received from the main transmission line 3 to the preparatory transmission line 4, and operates as shown in FIG. 3C to loop back a carrier received from the preparatory transmission line 4 to the main transmission line 3. The data send/receive controller 14 of the master station 1 can access either of the transmission line 3 and transmission line 4 through the send/receive control switch 13. For example, the master station 1 can issue a loop back command onto the transmission line 3 and receive a carrier of a response signal from an interrogated slave station 2 through the transmission line 4. Conversely, the master station 1 can issue a loop back command onto the transmission line 4 and receive a carrier of a response signal from an interrogated slave station 2 through the transmission line 3.

In regard of the internal construction, each slave station 2 has the same components as those of the master station 1, enumerating carrier transmitters 11, carrier receivers 12, a send/receive control switch 13 and a data send/receive controller 14, and in addition a terminal interface 5 through which terminals 6 are connected to an associated slave station. The data send/receive controller 14 of the slave station 2 can also access either of the transmission line 3 and transmission line 4 through the send/receive control switch 13. When a slave station is interrogated by the master station 1 and receives a loop back command therefrom through the transmission line 3, it can establish loop back of transmission line as shown in FIG. 3B. Conversely, when a slave station is interrogated by the master station 1 to receive a loop back command through the transmission line 4, it can establish loop back of transmission line as shown in FIG. 3C.

Figure 5A:
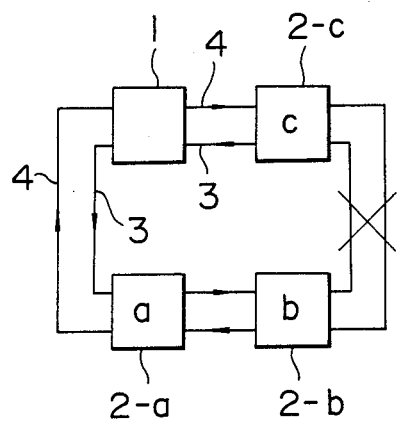
FIGS. 5A to 5D are diagrams explaining the loop back operation.
Figure 5B:
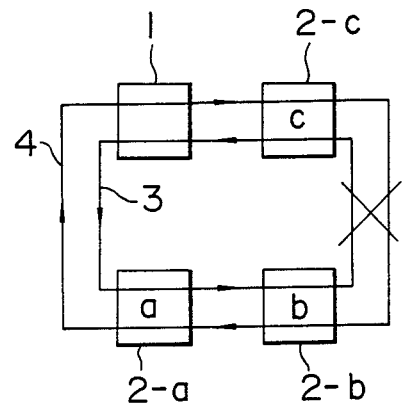
Figure 5C:
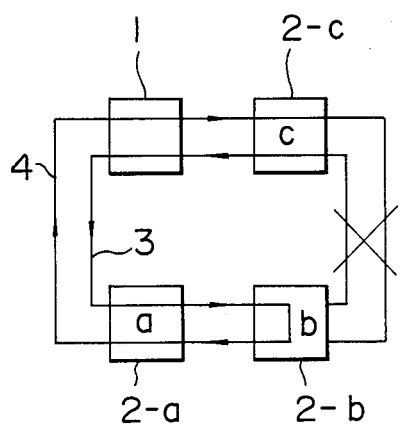

In the event that failures occur in both the main transmission line 3 and preparatory transmission line 4 as shown in FIG. 5A, the master station 1 refers to the network configuration information stored in the memory 15 of its own to determine the number of slave stations 2-a and 2-b preceding a slave station 2-c inclusive thereof which lies most downstream on the main transmission line 3, calculates a turn around time on the basis of the thus determined number of slave stations and a time delay per slave station on the assumption that the master station 1 issues a loop back command to the slave station 2-c, and transmits as shown in FIG. 5B a carrier and a signal representative of a loop back command to the slave station 2-c through the main transmission line 3. After the transmission, the master station 1 monitors the reception of a loop back carrier, i.e., a response signal from the slave station 2-c until the turn around time calculated for the slave station 2-c has elapsed. Since the master station 1 fails in effect to receive the carrier from the slave station 2-c after the lapse of the turn around time for the slave station 2-c, it decides failure of loop back. The master station 1 then calculates a turn around time for the adjacent slave station 2-b which lies upstream of the slave station 2-c on the main transmission line 3 in a similar manner and transmits a carrier and a loop back command to the slave station 2-b through the main transmission line 3. When receiving the loop back command from the master station 1 through the main transmission line 3, the slave station 2-b causes, under the direction of its data send/receive controller 14, its send/receive control switch 13 to loop back the transmission line 3 to the transmission line 4 as shown in FIG. 3B and loops back a carrier of a response signal to the master station 1 to be configured as shown in FIG. 5C. When the master station 1 receives the carrier from the slave station 2-b within the turn around time calculated therefor, it decides success of loop back on the main transmission line 3 and proceeds to a loop back operation on the preparatory transmission line 4.

Figure 5D:
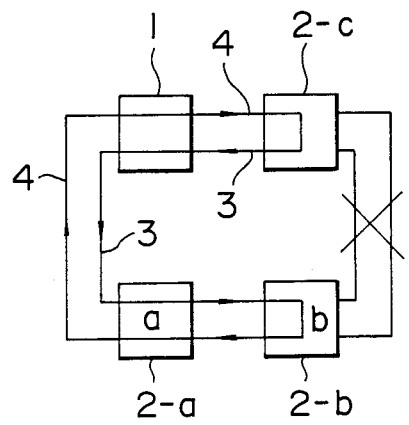

Thus, the master station 1 refers to the network constituting information stored in its memory 15 to determine the number of slave stations preceding the slave station 2-c inclusive thereof which lies along the preparatory transmission line upstream of the salve station 2-b looping back the main transmission line 3, calculates a turn around time for the slave station 2-c on the basis of the thus determined number of slave stations and a time delay per slave station, and transmits a carrier and a loop back command to the slave station 2-c through the preparatory transmission line 4. When receiving the loop back command from the master station 1 through the preparatory transmission line 4, the salve station 2-c causes, under the direction of its data send/receive controller 14, its send/receive control switch 13 to loop back the transmission line 4 to the transmission line 3 as shown in FIG. 3C and loops back a carrier of a response signal to the master station 1 to be configured as shown in FIG. 5D. When the master station 1 receives the carrier from the slave station 2-c within the turn around time calculated therefor, it decides success of loop back on the preparatory transmission line 4, thus completing a loop back operation.

In this manner, a formation of loop back can be achieved within a minimized interval of time when the failures occur in the system.

Figure 6:
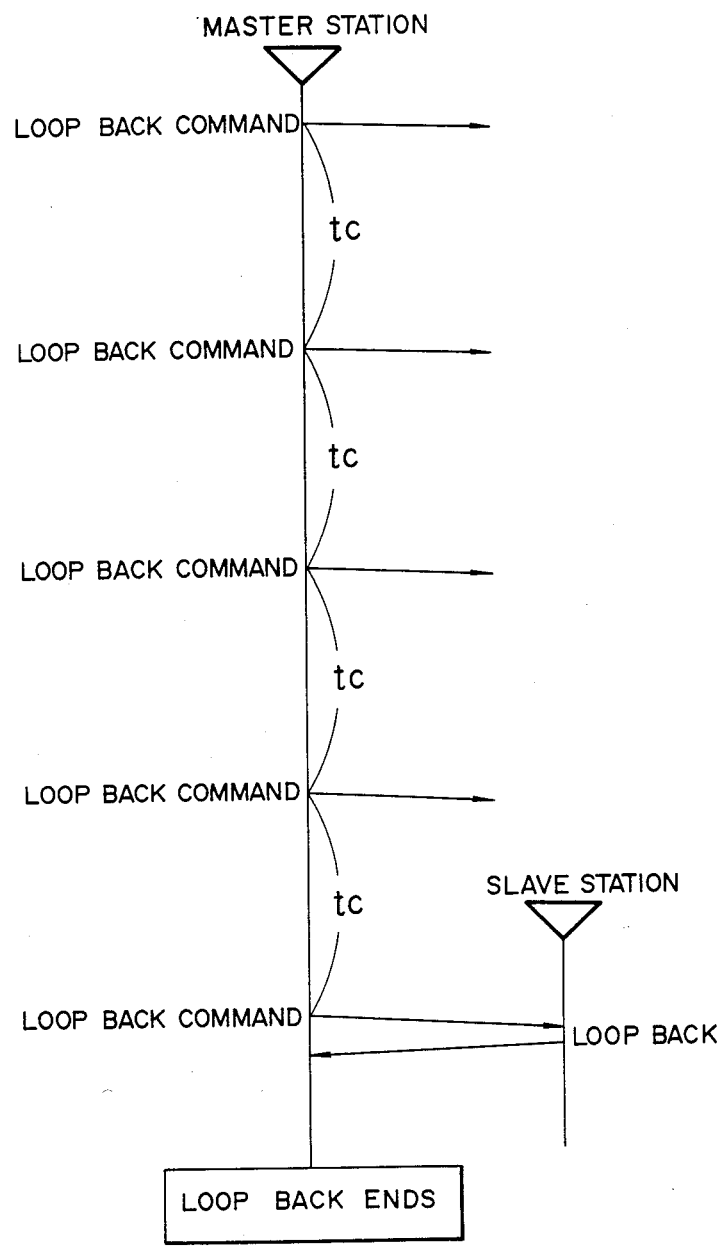
FIG. 6 is a time chart illustrative of a formation of loop back according to a prior art system.
Figures 7, 8:
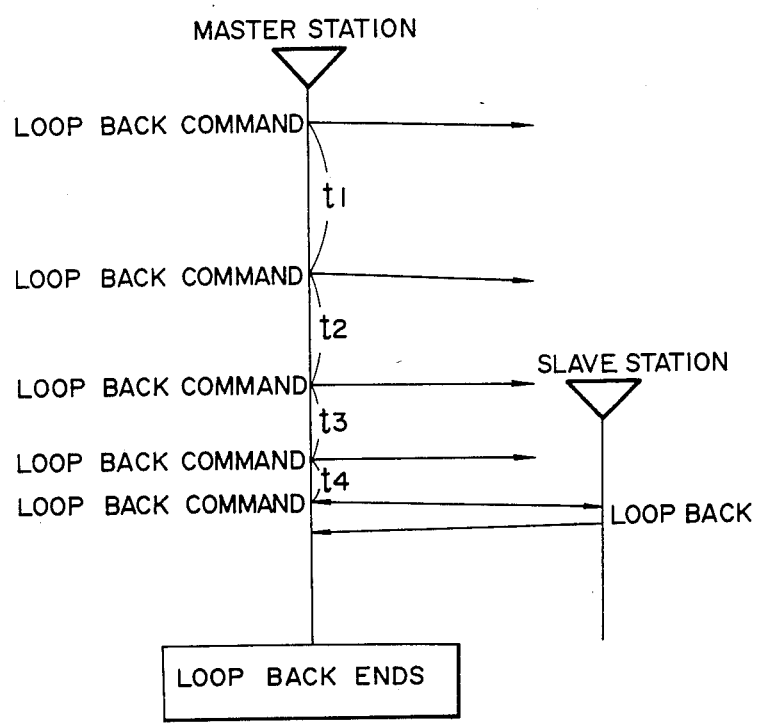
FIG. 7 is a time chart illustrative of a formation of loop back according to the system of the invention.
FIG. 8 is a table showing information used for network configuration.

FIG. 6 is a time chart illustrative of a formation of loop back according to a prior art system and FIG. 7 is a similar time chart in accordance with the embodiment of the invention. In the prior art system (FIG. 6), the turn around time $t_c$, which begins to run after the transmission of a loop back command from the master station to any interrogated slave station, is fixed and must be sufficiently larger than a time delay in receiving a response signal through the maximum number of slave stations connectable in the loop. Contrarily, in the present embodiment (FIG. 7), the turn around time takes a different value $t_1$, $t_2$, $t_3$ or $t_4$ which is dynamically calculated in accordance with the number of slave stations connected in the loop and is sufficiently smaller than $t_c$. Accordingly, the present embodiment can minimize the time required for the formation of loop back.

FIG. 8 shows an example of the network configuration information stored in the memory 15. For the loop network shown in FIGS. 5A to 5D, it is indicated by the information that the number of slave stations varies in the directions of the transmission lines 3 and 4 in accordance with an address of the respective slave stations. If the number of slave stations as shown in FIG. 8 can be calculated through simple calculation based on an address of a slave station 2, the number of salve stations may well be determined through the simple calculation without using the network configuration information shown in FIG. 8. For example, if the slave stations 2-a, 2-b and 2-c have addresses "1", "2" and "3", respectively, the number of slave stations representing the slave station 2-c in the direction of the transmission line 3 can be indicated by the address "3" of the slave station 2 by itself and can be indicated by (4 - that address) in the direction of the transmission line 4.

Figure 9:
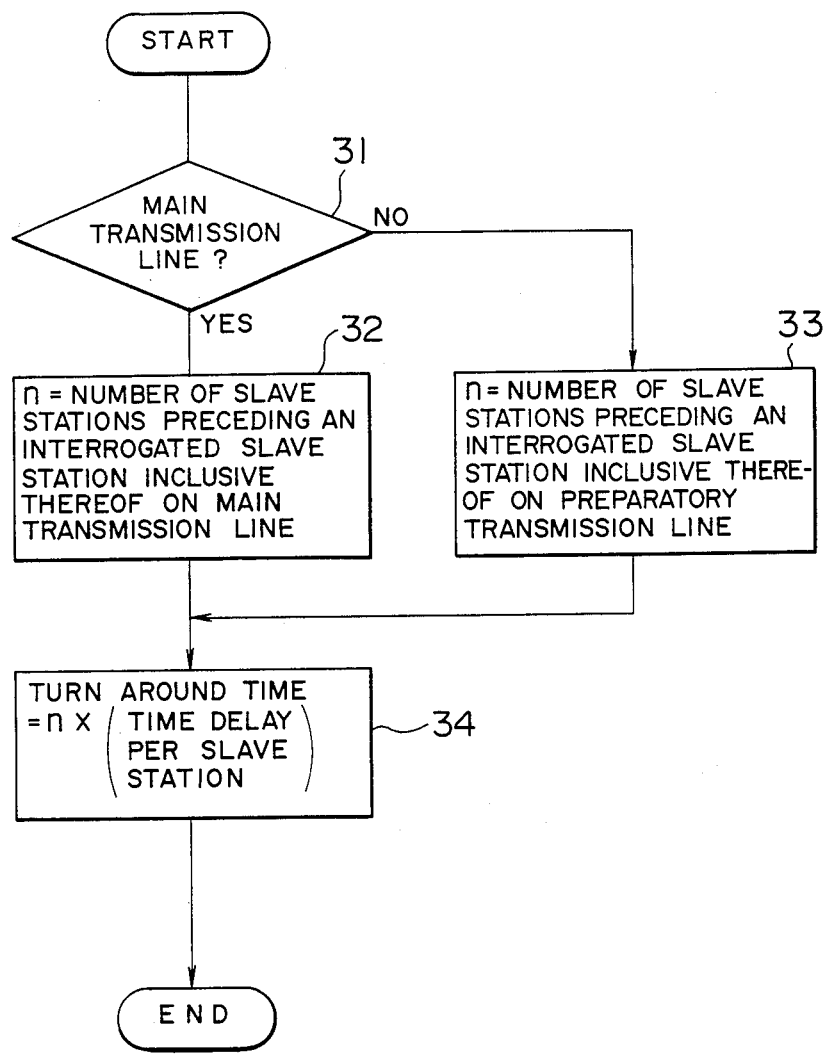
FIG. 9 is a flow chart of processings for calculating a turn around time for an interrogated slave station.

FIG. 9 shows a flow chart of process of calculating a turn around time executed in the data send/receive controller 14 of the master station 1. When the main transmission line 3 is used as transmission line (YES from step 31), the data send/receive controller 14 determines the number n of slave stations preceding (upstream of) an interrogated slave station inclusive thereof on the transmission line 3 either by looking up the network configuration information stored in the memory 15 or on the basis of an address of the interrogated slave station (step 32), and calculates a turn around time required for the master station to receive a response signal from the interrogated slave station in accordance with a calculation formula of (turn around time)=n x (time delay per slave station) in step 34. When the preparatory transmission line 4 is used as transmission line (NO from step 31), the data send/receive controller 14 determines the number n of slave stations preceding (upstream of) an interrogated slave station inclusive thereof on the transmission line 4 either by looking up the network configuration information stored in the memory 15 or on the basis of an address of the interrogated slave station (step 33) and calculates, using n in a similar manner, a turn around time required for the master station 1 to receive a response signal from the interrogated slave station after the transmission of a loop back command thereto (step 34).

Accordingly, the time delay per slave station is the one derived from the turn around time which includes a time delay required in general in propagation of a loop back command signal carrier which is issued from the master station and reaches an interrogated slave station, a processing time for generating a response signal in the interrogated slave station, a time required for the send-/receive control switch 13 to be switched for loop back, and a time delay in propagation of the response signal carrier which is looped back through the looped back transmission line and reaches the master station. In an alternative, the interrogated slave station may temporarily store a loop back command signal transmitted from the master station and thereafter may return or loop back the loop back command signal as a response signal to the master station.

Figure 10:
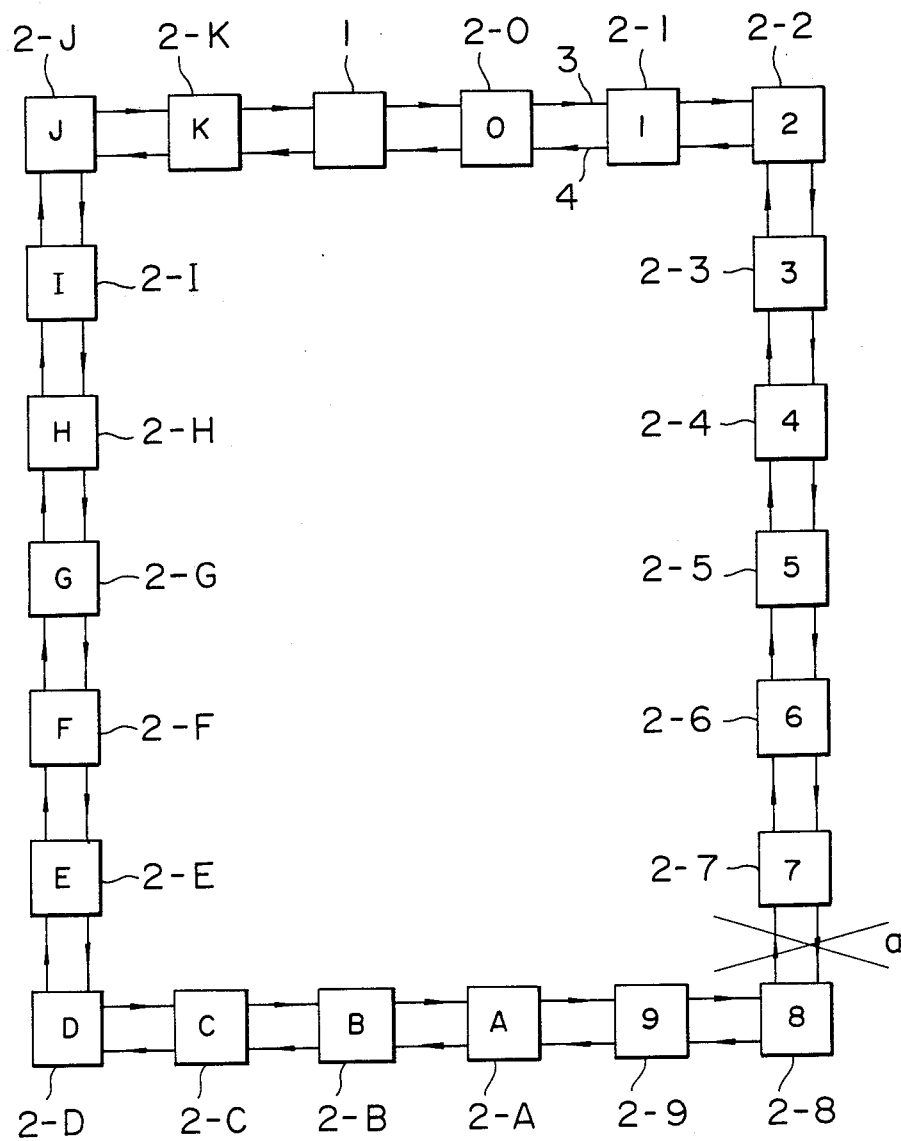
FIG. 10 is a block diagram schematically illustrating a loop communication system according to another embodiment of the invention.

A loop communication system according to a second embodiment of the invention has a network configuration as illustrated in FIG. 10 and can also minimize the loop back time.

Referring to FIG. 10, a plurality of slave stations 2-0 to 2-9 and 2-A to 2-K are connected to each other and to a master station 1 through a main transmission line 3 and a preparatory transmission line 4. The master station 1 has the same configuration and function as those of the master station 1 in the previous embodiment, and each slave station has the same configuration and function as those of each slave station in the previous embodiment.

In the event that failures occur at a point a, the master station 1 transmits a loop back command to the slave station 2-A which lies substantially at the middle between the slave station 2-0 at the most upstream and the slave station 2-K at the most downstream on the main transmission line 3. After the transmission of the loop back command, the master station 1 calculates a turn around time in accordance with the flow chart shown in FIG. 9 and monitors the reception of a carrier from the interrogated slave station 2-A. Since no carrier is received in effect from the slave station 2-A within the turn around time, the master station 1 decides failure of loop back and then transmits a loop back command to the slave station 2-5 which lies substantially at the middle between the slave stations 2-A and 2-0. The slave station 2-5 responds to the command from the master station 1 and loops back a carrier of a response signal to the master station 1. After receiving the carrier from the slave station 2-5, the master station transmits a loop back release command to the slave station 2-5. Subsequently, the master station 1 transmits a loop back command to the slave station 2-8 which lies substantially at the middle between the slave stations 2-5 and 2-A. Since in effect the master station 1 does not receive a carrier from the slave station 2-8 within a turn around time calculated therefor in accordance with the flow chart of FIG. 9, it decides failure of loop back and then transmits a loop back command to the slave station 2-7 which lies substantially at the middle between the slave stations 2-8 and 2-5. Responsive to the command from the master station 1, the slave station 2-7 loops back a carrier to the master station 1. Now, the master station 1 receives the carrier from the slave station 2-7 within a turn around time therefor and decides that failures are present between the slave stations 2-7 and 2-8, thus completing the loop back through the main transmission line. Thereafter, the master station 1 transmits a loop back command to the slave station 2-8 through the preparatory transmission line 4 and forms the complete loop back.

Figure 11:
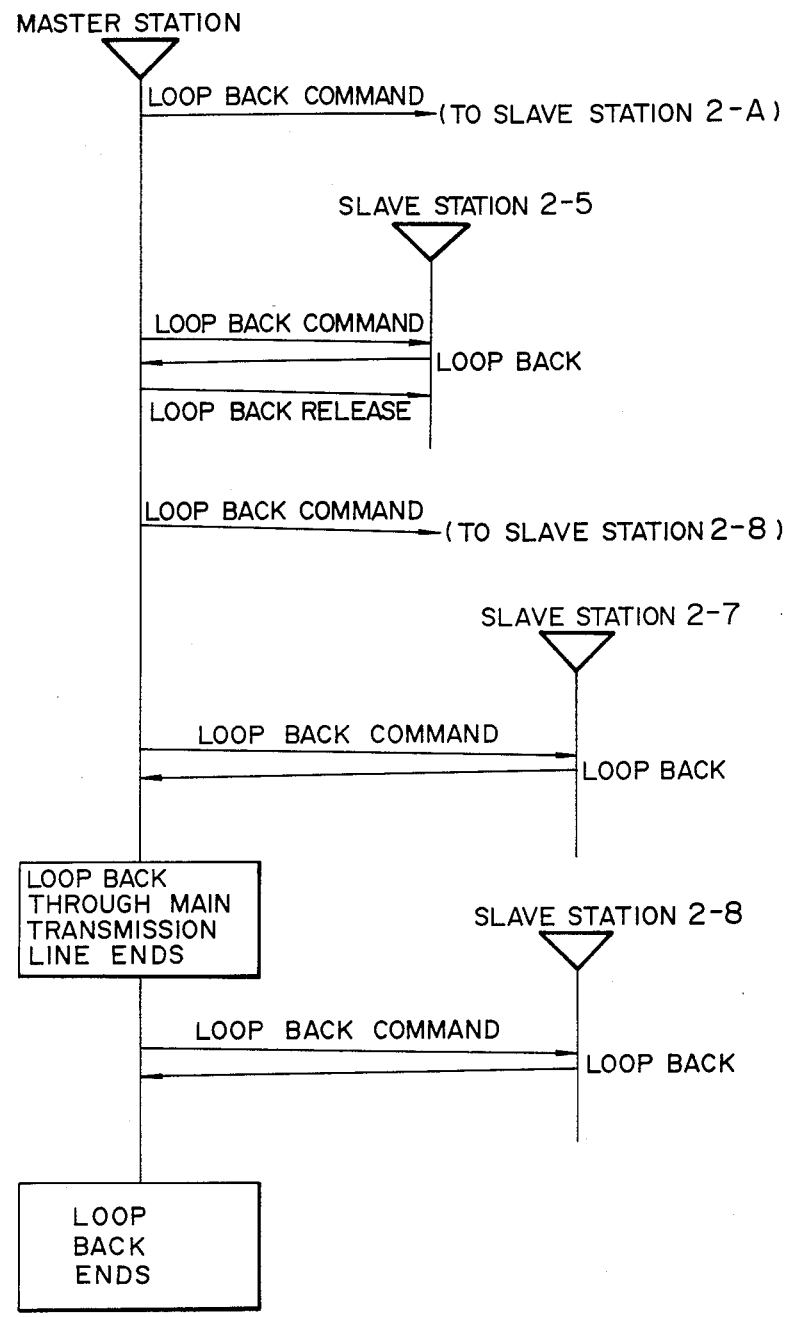
FIG. 11 shows the operation sequence in the FIG. 10 embodiment.

The operation sequence in the second embodiment is illustrated in FIG. 11.

Figure 12A:
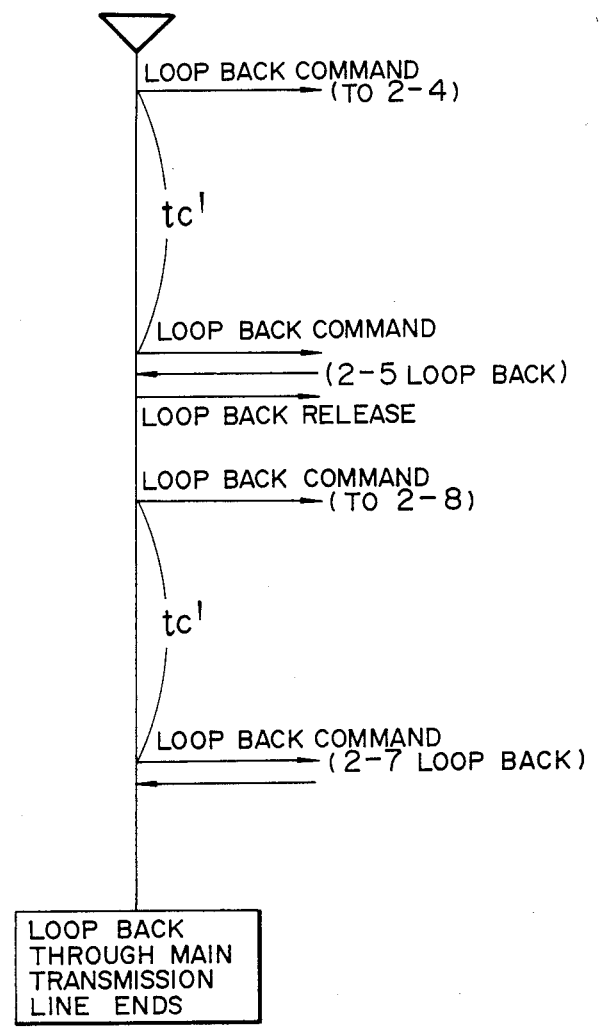
FIG. 12A is a time chart illustrative of a formation of prior art system.
Figure 12B:
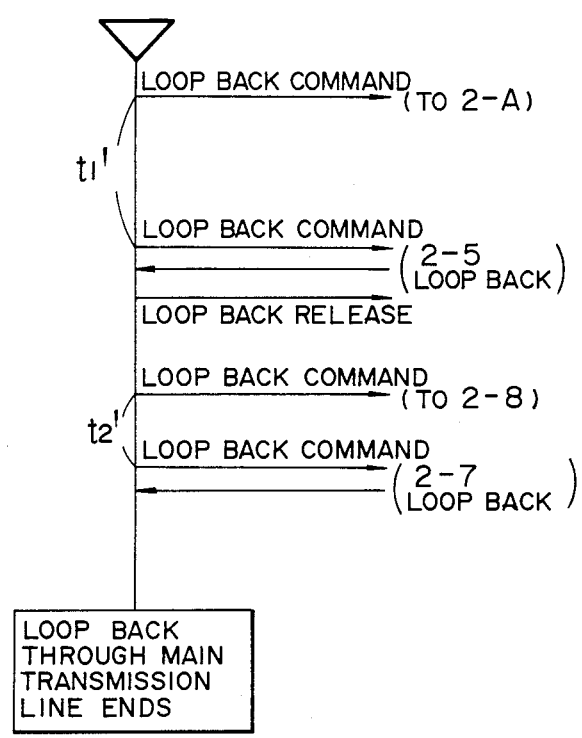
FIG. 12B is a time chart for explaining a formation of loop back, in comparison with that shown in FIG. 12A, implemented with the system shown in FIG. 10.

If the second embodiment is implemented with the prior art system, the turn around time $t_c'$ is fixed as shown in FIG. 12A and must be sufficiently larger than a time delay in receiving a response signal through the maximum number of slave stations connectable in the loop. Contrarily, in the second embodiment, the turn around time takes, as shown in FIG. 12B, a different value $t_1'$ or $t_2'$ which is dynamically calculated in accordance with the number of slave stations connected in the loop and is sufficiently smaller than $t_c'$. Accordingly, the second embodiment can also minimize the time required for the establishment of loop back.

As described above, according to the invention, the time for a loop back operation executed when a failure occurs in the system can be reduced and an interval of the block in communications can be decreased.

We claim:

1. A loop communication system comprising:
   a pair of loop transmission lines through which carriers are sent or received in directions opposite to each other;
   a master station connected to said transmission lines to transmit a signal representative of a loop back command through one of said transmission lines and receive a response signal through the other transmission line; and
   a plurality of slave stations connected to said transmission lines, each slave station being operative to loop back one transmission line through which it receives said loop back command signal from said master station to the other transmission line and to transmit said response signal through the other transmission line,
   said master station comprising means for determining the number of slave stations present between said master station and an interrogated slave station inclusive thereof on one transmission line through which said master station transmits a loop back command signal to said interrogated slave station, calculating a turn around time required for said master station to receive a response signal from said interrogated slave station after the transmission of said loop back command signal on the basis of the determined number of slave stations, and deciding failure of loop back when said master station does not receive said response signal from said interrogated slave station within said turn around time and effecting the above operation for a different slave station.

2. A loop communication system according to claim 1 wherein said master station transmits a loop back command signal to a slave station at the most downstream on one transmission line and in the event of failure of loop back, it transmits the loop back command signal to a slave station at the next most downstream.

3. A loop communication system according to claim 1 wherein said master station transmits a loop back command signal to a first slave station which lies substantially at the middle between a slave station at the most upstream and a slave station at the most downstream on one transmission line and in the event of failure of loop back, it transmits the loop back command signal to a second slave station which lies substantially at the middle between said slave station at the most upstream and said first slave station.

4. A loop communication system according to claim 1 wherein said turn around time is calculated as a product obtained by multiplication of the number of slave stations preceding said interrogated slave station inclusive thereof on one transmission line and time delay per slave station.

5. A loop communication system according to claim 1 wherein said pair of transmission lines comprise a main transmission line mainly used for loop communications and a preparatory transmission line used when said main transmission line has a failure.

6. A loop communication system according to claim 1 wherein said master station determines the number of slave stations by referencing a memory which stores network configuration information indicative of correspondence between addresses of said slave stations and the number of slave stations on one transmission line.

7. A loop communication system according to claim 1 wherein said master station determines individual slave stations on one transmission line on the basis of their addresses.

* * * * *